No. 806,647. PATENTED DEC. 5, 1905.
J. DEAN.
TOOL FOR APPLYING WIRE FENCE STAYS.
APPLICATION FILED DEC. 24, 1904.
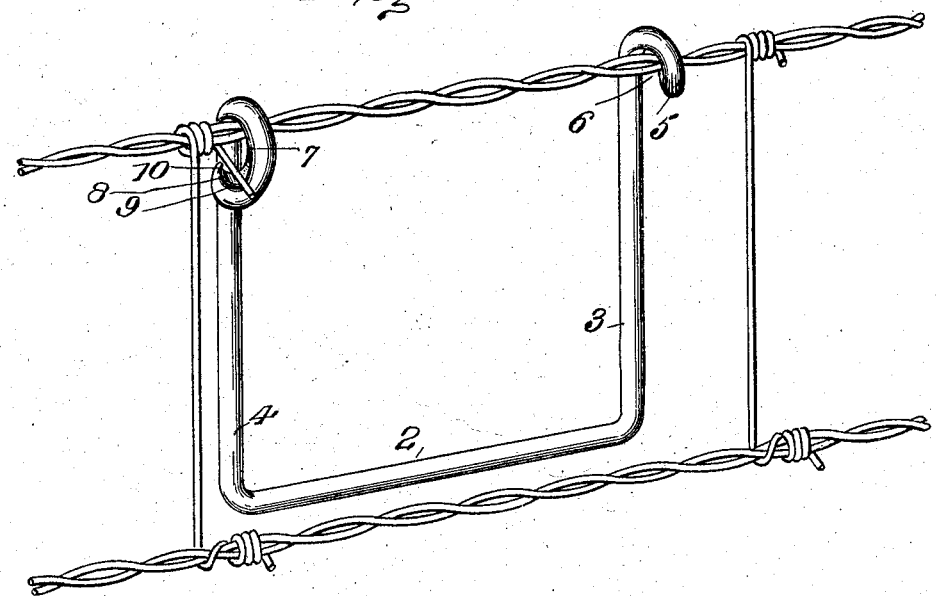
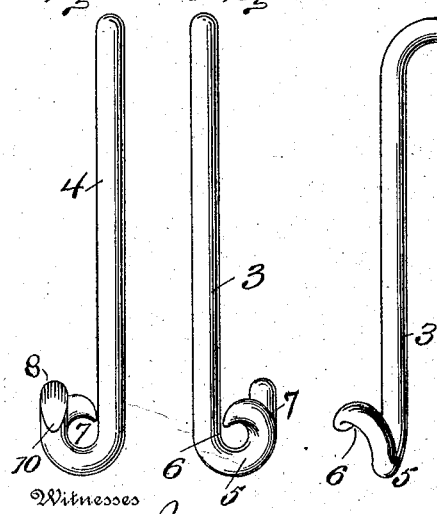

UNITED STATES PATENT OFFICE.

JOHN DEAN, OF RACINE, WISCONSIN.

TOOL FOR APPLYING WIRE-FENCE STAYS.

No. 806,647.          Specification of Letters Patent.          Patented Dec. 5, 1905.

Application filed December 24, 1904. Serial No. 238,249.

*To all whom it may concern:*

Be it known that I, JOHN DEAN, a citizen of the United States, residing at Racine, Racine county, State of Wisconsin, have invented certain new and useful Improvements in Tools for Applying Wire-Fence Stays; and I do hereby declare the following to be a full, clear, and exact description of the invention, such as will enable others skilled in the art to which it appertains to make and use the same.

This invention relates to certain improvements in tools for applying fence stay-wires and for coiling or splicing wire.

An object of the invention is to provide an improved, simple, durable, and effective implement for the use of linemen, farmers, and others and by which stay-wires can be easily applied to and coiled on fence-wires, wires can be easily spliced by coiling, and whereby one wire can be readily coiled on another wire.

The invention consists in certain novel features in construction or in combinations or arrangements of parts, as more fully and particularly explained hereinafter.

Referring to the accompanying drawings, which show a preferred embodiment of my invention merely as an example for purposes of explanation from among other constructions within the spirit and scope of my invention, Figure 1 is a perspective view of a portion of a wire fence, showing a tool of my invention in the act of coiling a stay on a fence line-wire. Fig. 2 is an end view of the tool. Fig. 3 is an end view of the opposite end of the tool. Fig. 4 is a front elevation.

The tool shown in the drawings consists of a strong metal bar or rod bent into approximately U shape, forming the cross-bar or handle portion 2, and the two usually straight parallel legs 3 4 of approximately the same length. One end of the rod is bent to form the coil 5 at the end of the arm or leg 3. The rod end is usually bent into a spiral of one open convolution in the form of an eye, having a side opening 6 between the coil extremity and the straight length or leg portion for the easy passage of the line-wire into the eye or coil. The opposite end of the rod is bent to form a notch, recess, or socket, usually in the form of a hook 7, at the end of the leg 4 and opening inwardly—that is, toward the handle of the implement. The free end or bill of this hook terminates in a lateral projection 8, arranged transversely or at right angles to the plane of the hook. This projection 8 is preferably formed with a concaved outer face constituting a wire-receiving socket or seat 9, terminating in an upwardly-projecting guard 10, to retain the wire from slipping laterally from said seat.

In using the implement the coil or eye is slipped onto the line-wire and the hook at the opposite end of the implement drops onto the line-wire, so that the device can hang from and slide along the line-wire as the operation of applying the stays progresses and is held in proper position with respect to the line-wire by the hook and coil, which are spaced apart. The coil practically embraces the line-wire, and hence holds the hook from slipping off during the coiling operation as the implement swings around the line-wire. When one coil has been completed, the implement can be pushed along the line-wire until the hook reaches the point where the next coil is to be made. The stays can be formed of wires cut to the desired length, and any suitable wire can be used for this purpose, such as old or used fence-wire. The stay to be coiled is placed against the line-wire and projecting beyond the same a suitable distance, with the projecting end resting in the wire-receiving seat of the projection 8. The implement is then swung around the line-wire as a center the desired number of times to coil the stay around the line-wire to the extent desired through the medium of the projection 8, which rotates around and a distance from the line-wire and rolls or presses the stay end around and down on the line-wire in the form of a coil.

The implement can be used for various purposes in coiling one wire on another and is exceedingly simple and durable in construction and easy and efficient in action.

What I claim is—

1. A tool for the purpose described, comprising a U-shaped rod at one end provided with a line-wire-receiving open coil, and at the other end provided with a line-wire-receiving hook having its free end bent laterally and forming a wire engaging and coiling projection.

2. As an article of manufacture, a wire-coiling tool comprising two spaced connected arms, one arm at its extremity having an encircling guide and line-wire-receiving coil formed by an open spiral having a side opening, the extremity of the other arm formed with a line-wire-receiving socket in alinement with said coil and having the lateral wire engaging and coiling projection, substantially as described.

In testimony whereof I affix my signature in presence of two witnesses.

JOHN DEAN.

Witnesses:
 JAMES PRITCHARD,
 F. A. KRADWELL.